(12) United States Patent
Wang et al.

(10) Patent No.: US 11,445,122 B2
(45) Date of Patent: Sep. 13, 2022

(54) IMAGE PROCESSING METHOD AND APPARATUS, AND DEVICE

(71) Applicant: Huawei Technologies Co., Ltd., Shenzhen (CN)

(72) Inventors: Yinting Wang, Hangzhou (CN); Biying Hu, Hangzhou (CN); Xi Zhang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 246 days.

(21) Appl. No.: 16/847,178

(22) Filed: Apr. 13, 2020

(65) Prior Publication Data
US 2020/0244862 A1 Jul. 30, 2020

Related U.S. Application Data

(63) Continuation of application No. PCT/CN2018/109951, filed on Oct. 12, 2018.

(30) Foreign Application Priority Data

Oct. 13, 2017 (CN) .......................... 201710954301.1
Oct. 16, 2017 (CN) .......................... 201710959936.0

(51) Int. Cl.
*H04N 5/235* (2006.01)
*G06T 3/00* (2006.01)
(Continued)

(52) U.S. Cl.
CPC ......... *H04N 5/2353* (2013.01); *G06T 3/0068* (2013.01); *G06T 5/006* (2013.01);
(Continued)

(58) Field of Classification Search
None
See application file for complete search history.

(56) References Cited

U.S. PATENT DOCUMENTS 8,624,923 B2 * 1/2014 Wajs .................... G06T 5/50
382/271
2004/0032575 A1 2/2004 Nishi et al.
(Continued)

FOREIGN PATENT DOCUMENTS

CN 1242104 A 1/2000
CN 104349066 A 2/2015
(Continued)

OTHER PUBLICATIONS

Yoo, Y., et al., "A digital ISO expansion technique for digital cameras," Proceedings of SPIE, vol. 7537, XP55740015, Jan. 17, 2010, p. 1-13.
(Continued)

*Primary Examiner* — James M Hannett
(74) *Attorney, Agent, or Firm* — Conley Rose, P.C.

(57) ABSTRACT

An image processing method includes obtaining N frames of images, determining one of the N frames of images as a reference image, where the other N−1 frames of images are to-be-processed images, obtaining N−1 frames of ghost-free images based on the N−1 frames of to-be-processed images, and performing an averaging operation on the reference image and the N−1 frames of ghost-free images, to obtain a first target image.

17 Claims, 4 Drawing Sheets

(51) Int. Cl.
*G06T 5/00* (2006.01)
*G06T 5/50* (2006.01)

(52) U.S. Cl.
CPC ............... *G06T 5/009* (2013.01); *G06T 5/50* (2013.01); *G06T 2207/20216* (2013.01); *G06T 2207/20221* (2013.01); *G06T 2207/20224* (2013.01)

(56) References Cited

U.S. PATENT DOCUMENTS

| | | | |
|---|---|---|---|
| 2014/0294370 A1* | 10/2014 | Lin | H04N 5/23258 396/53 |
| 2014/0362256 A1* | 12/2014 | Schulze | H04N 5/23277 382/284 |
| 2014/0363087 A1 | 12/2014 | Tico et al. | |

FOREIGN PATENT DOCUMENTS

| | | |
|---|---|---|
| CN | 105264567 A | 1/2016 |
| CN | 105931213 A | 9/2016 |
| CN | 106506981 A | 3/2017 |
| EP | 1770989 A2 | 4/2007 |
| EP | 2816527 A1 | 12/2014 |

OTHER PUBLICATIONS

Hasinoff, S., et al., "Burst photography for high dynamic range and low-light imaging on mobile cameras," ACM Transactions On Graphics, ACM, NY, US, vol. 35, No. 6, XP058306351, Nov. 11, 2016, pp. 1-12.

\* cited by examiner

IMAGE PROCESSING METHOD AND APPARATUS, AND DEVICE

CROSS-REFERENCE TO RELATED APPLICATIONS

This application is a continuation of International Patent Application No. PCT/CN2018/109951 filed on Oct. 12, 2018, which claims priority to Chinese Patent Application No. 201710954301.1 filed on Oct. 13, 2017 and Chinese Patent Application No. 201710959936.0 filed on Oct. 16, 2017, which are hereby incorporated by reference in their entireties.

TECHNICAL FIELD

The present disclosure relates to the field of terminal technologies, and in particular, to an image processing method and apparatus, and a device.

BACKGROUND

In real life, motion blur occurs more or less when a moving object is photographed, and streaking becomes even worse when a fast-moving target such as a playing child or a running pet is photographed. During an exposure after a shutter button is pressed, unsteady hands may cause an image to be blurrier.

To improve sharpness of a photographed image of a moving object and mitigate impact of unsteady hands, professional photographers often arm themselves with an expensive lens with a wide aperture and optical image stabilization, a tripod, and other equipment to aid photography. However, for mobile phone users who may take a photo anytime and anywhere, such methods are difficult to be prevalent because they are expensive, not portable, or the like.

To resolve the motion blur and accompanying common problems concerning luminance, noise, and the like that may exist during photographing, the present disclosure provides a set of photographing methods for snapping a moving scene.

SUMMARY

Embodiments of the present disclosure provide an image processing method and apparatus, and a device, to provide a snapshot mechanism for a user. When a moving scene is processed, an image with high sharpness can be snapped, thereby improving photographing experience of the user.

Specific technical solutions provided in the embodiments of the present disclosure are as follows.

According to a first aspect, an embodiment of the present disclosure provides an image processing method. The method includes obtaining N frames of images, determining one of the N frames of images as a reference image, where the other N−1 frames of images are to-be-processed images, obtaining N−1 frames of ghost-free images based on the N−1 frames of to-be-processed images, and performing an averaging operation on the reference image and the N−1 frames of ghost-free images, to obtain a first target image, where the obtaining N−1 frames of ghost-free images based on the N−1 frames of to-be-processed images includes performing step 1 to step 4 on an $i^{th}$ frame of image in the N−1 frames of to-be-processed images, where values of i are all positive integers that are not greater than N−1, and step 1 perform registration on the $i^{th}$ frame of image and the reference image, to obtain an $i^{th}$ registered image, step 2 obtain an $i^{th}$ difference image based on the $i^{th}$ registered image and the reference image, step 3 obtain an $i^{th}$ ghost weight image based on the $i^{th}$ difference image, and step 4 perform fusion on the $i^{th}$ registered image and the reference image based on the $i^{th}$ ghost weight image, to obtain an $i^{th}$ frame of ghost-free image.

According to a second aspect, an embodiment of the present disclosure provides an image processing apparatus. The apparatus includes an obtaining module configured to obtain N frames of images, a determining module configured to determine one of the N frames of images as a reference image, where the other N−1 frames of images are to-be-processed images, a ghost-removal module, configured perform step 1 to step 4 on an $i^{th}$ frame of image in the N−1 frames of to-be-processed images, to obtain N−1 frames of ghost-free images, where values of i are all positive integers that are not greater than N−1, and step 1 perform registration on the $i^{th}$ frame of image and the reference image, to obtain an $i^{th}$ registered image, step 2 obtain an $i^{th}$ difference image based on the $i^{th}$ registered image and the reference image, step 3 obtain an $i^{th}$ ghost weight image based on the $i^{th}$ difference image, and step 4 perform fusion on the $i^{th}$ registered image and the reference image based on the $i^{th}$ ghost weight image, to obtain an $i^{th}$ frame of ghost-free image, and an averaging operation module configured to perform an averaging operation on the reference image and the N−1 frames of ghost-free images, to obtain a first target image.

According to the technical solutions of the foregoing method and apparatus provided in the embodiments of the present disclosure, in a moving scene, a user can still snap a moving image and obtain an image with high sharpness.

According to the first aspect or the second aspect, in a possible design, before the obtaining N frames of images, the method further includes, when it is detected that the following three cases exist at the same time, generating a control signal, where the control signal is used to instruct to obtain the N frames of images, and case 1 it is detected that a to-be-photographed image of a camera is a moving image, case 2 it is detected that a current exposure time of the camera exceeds a safe time, and case 3 it is detected that the camera is in an extreme high-light scene, and correspondingly, current International Organization of Standardization (ISO) sensitivity of the camera is less than a first preset threshold and the current exposure time is less than a second preset threshold. As a supplement to this embodiment, a corresponding control signal may be generated once at least one of the foregoing three cases is detected. For example, if the case 3 is detected, which indicates extreme high-light conditions, the camera intelligently switches to a first snapshot mode mentioned below, and generates the control signal to obtain the N frames of images in the first snapshot mode. A method of detecting the foregoing case may be performed by a detection module.

According to the first aspect or the second aspect, in a possible design, the obtaining N frames of images includes, with a product of the current ISO sensitivity and the current exposure time of the camera unchanged, reducing the exposure time and increasing the ISO sensitivity at a preset ratio, to obtain a first exposure time and first ISO sensitivity, and setting the current exposure time and the current ISO sensitivity of the camera to the first exposure time and the first ISO sensitivity respectively, and photographing the N frames of images.

According to the first aspect or the second aspect, in a possible design, before the obtaining N frames of images, the method further includes, when it is detected that the following three cases exist at the same time, generating a control signal, where the control signal is used to instruct to obtain the N frames of images, and case 1 it is detected that a to-be-photographed image of a camera is a moving image, case 2 it is detected that a current exposure time of the camera exceeds a safe time, and case 3 it is detected that the camera is in a moderate high-light scene, and correspondingly, current ISO sensitivity of the camera is in a first preset threshold interval and the current exposure time is in a second preset threshold interval. As a supplement to this embodiment, a corresponding control signal may be generated once at least one of the foregoing three cases is detected. For example, if the case 3 is detected, which indicates moderate high-light conditions, the camera intelligently switches to a second snapshot mode or a third snapshot mode mentioned below, and generates the control signal to obtain the N frames of images in the second snapshot mode or the third snapshot mode. A method of detecting the foregoing case may be performed by a detection module.

According to the first aspect or the second aspect, in a possible design, namely, the second snapshot mode, the obtaining N frames of images includes, with a product of the current ISO sensitivity and the current exposure time of the camera unchanged, reducing the exposure time and increasing the ISO sensitivity at a preset ratio, to obtain a second exposure time and second ISO sensitivity, and setting the current exposure time and the current ISO sensitivity of the camera to the second exposure time and the second ISO sensitivity respectively, and photographing the N frames of images. The method further includes photographing one frame of first new image based on the current ISO sensitivity and the exposure time of the camera, and obtaining a second target image based on the first target image and the first new image. This technical solution may be used for a pure snapshot mode, in which there is no need to decide on a current photographing environment.

According to the first aspect or the second aspect, in a possible design, namely, the second snapshot mode, the obtaining a second target image based on the first target image and the first new image includes performing registration on the first new image and the reference image or the first target image, to obtain a first registered image, obtaining a first difference image based on the first registered image and the first target image, obtaining a first ghost weight image based on the first difference image, performing fusion on the first registered image and the first target image based on the first ghost weight image, to obtain a first ghost-free image, and performing pixel-value weighted fusion based on the first ghost-free image and the first target image, to obtain the second target image.

According to the first aspect or the second aspect, in a possible design, namely, the third snapshot mode, the obtaining N frames of images includes, with the current ISO sensitivity of the camera unchanged, setting the current exposure time to a third exposure time that is shorter, and photographing the N frames of images, and the method further includes photographing one frame of second new image based on the current ISO sensitivity and the current exposure time of the camera, and obtaining a third target image based on the first target image and the second new image. This technical solution may be used for a pure snapshot mode, in which there is no need to decide on a current photographing environment.

According to the first aspect or the second aspect, in a possible design, namely, the third snapshot mode, the obtaining a third target image based on the first target image and the second new image includes processing the first target image based on the second new image according to a preset luminance correction algorithm, to obtain a fourth target image, performing registration on the second new image and the reference image or the fourth target image, to obtain a third (fourth) registered image, obtaining a third (fourth) difference image based on the third (fourth) registered image and the fourth target image, obtaining a third (fourth) ghost weight image based on the third (fourth) difference image, performing fusion on the third (fourth) registered image and the fourth target image based on the third (fourth) ghost weight image, to obtain a third (fourth) ghost-free image, performing pixel-value weighted fusion based on the third (fourth) ghost-free image and the fourth target image, to obtain a fifth (sixth) target image, and performing pyramid fusion on the fifth (sixth) target image and the first target image, to obtain the third target image.

Further, the foregoing possible technical implementations may be implemented by a processor invoking a program and instruction in a memory to perform corresponding computing processing.

According to the first aspect or the second aspect, in a possible design, according to a choice of a user, the terminal directly enters a snapshot mode, for example, the first snapshot mode, the second snapshot mode, or the third snapshot mode that is mentioned above. In this case, the terminal does not need to detect an environment of a to-be-photographed scene, because there is a preset parameter rule (prestored locally in the terminal or a cloud server) for each snapshot mode. In an embodiment, each snapshot mode has corresponding ISO sensitivity and a corresponding exposure time, and certainly, there may be other performance parameters or the like. Upon entering a particular snapshot mode, the camera automatically adjusts to corresponding ISO sensitivity and a corresponding exposure time to photograph. Therefore, if the user directly uses the snapshot mode, the obtaining N frames of images may be photographing the N images using the corresponding ISO sensitivity and the corresponding exposure time, to perform subsequent image processing in a corresponding mode.

In the first snapshot mode, in a possible design, a photographing action may be triggered by the user pressing a shutter button. In one case, before the user presses the shutter button, the current exposure time and the current ISO sensitivity of the camera are already adjusted to the first exposure time and the first ISO sensitivity, and when the user presses the shutter button, the camera photographs the N images using the first exposure time and the first ISO sensitivity, for subsequent processing. In another case, before the user presses the shutter button, the camera still maintains the current ISO sensitivity and the current exposure time, and when the user presses the shutter button, the current exposure time and the current ISO sensitivity of the camera are adjusted to the first exposure time and the first ISO sensitivity, and the camera photographs the N images using the first exposure time and the first ISO sensitivity, for subsequent processing. In addition, in a preview image data stream, the image may be displayed with the current ISO sensitivity and the current exposure time, or may be displayed with the first exposure time and the first ISO sensitivity.

In the second snapshot mode, in a possible design, a photographing action may be triggered by the user pressing a shutter button. In one case, when the user presses the shutter button, one frame of first new image is obtained using the current ISO sensitivity and the current exposure time, the current exposure time and the current ISO sensitivity are adjusted to the second exposure time and the second ISO sensitivity, and the N images are photographed in this condition, and N+1 images are obtained in total, for subsequent processing. In another case, when the user presses the shutter button, the current exposure time and the current ISO sensitivity are set to the second exposure time and the second ISO sensitivity, and the N images are photographed in this condition, then one frame of first new image is obtained still using the current ISO sensitivity and the current exposure time, and N+1 images are obtained in total, for subsequent processing. In addition, in a preview image data stream, the image may be displayed with the current ISO sensitivity and the current exposure time, or may be displayed with the second exposure time and the second ISO sensitivity.

In the third snapshot mode, in a possible design, a photographing action may be triggered by the user pressing a shutter button. In one case, when the user presses the shutter button, one frame of second new image is obtained using the current ISO sensitivity and the current exposure time, with the current ISO sensitivity of the camera unchanged, the current exposure time is set to the third exposure time that is shorter, and the N images are photographed in this condition, and N+1 images are obtained in total, for subsequent processing. In another case, when the user presses the shutter button, the current exposure time is set to the third exposure time that is shorter, and the N images are photographed in this condition, then one frame of second new image is obtained still using the current ISO sensitivity and the current exposure time, and N+1 images are obtained in total, for subsequent processing. In addition, in a preview image data stream, the image may be displayed with the current ISO sensitivity and the current exposure time, or may be displayed with the third exposure time and the current ISO sensitivity.

According to a third aspect, an embodiment of the present disclosure provides a terminal device. The terminal device includes a memory, a processor, a bus, a camera lens, and the memory, the camera lens, and the processor are connected using the bus, where the camera lens is configured to collect an image signal under control of the processor, the memory is configured to store a computer program and instruction, and the processor is configured to invoke the computer program and instruction stored in the memory such that the terminal device performs the method according to any one of the foregoing possible designs.

According to the third aspect, in a possible design, the terminal device further includes an antenna system, and under control of the processor, the antenna system sends and receives a radio communication signal to implement radio communication with a mobile communications network, where the mobile communications network includes one or more of the following a Global System for Mobile Communications (GSM) network, a code-division multiple access (CDMA) network, a third generation (3G) network, a fourth generation (4G) network, frequency-division multiple access (FDMA), time-division multiple access (TDMA), Personal Digital Cellular (PDC), Total Access Communication System (TACS), Advanced Mobile Phone System (AMPS), wideband CDMA (WCDMA), time-division synchronous CDMA (TDSCDMA), WI-FI, and a Long Term Evolution (LTE) network.

The foregoing method, apparatus, and device can not only be applied to a photographing scenario using camera software that comes with a terminal, but also be applied to a photographing scenario using third-party camera software running in the terminal. Photographing includes normal photographing, selfie photographing, and other photographing modes such as a video call, a video conference, virtual reality (VR) photography, and aerial photography.

According to the foregoing solutions, the terminal in the embodiments of the present disclosure may include a plurality of photographing modes, for example, a pure snapshot mode, or a smart photographing mode that determines, depending on a result of scene detection, whether to snap an image. When a terminal is in a snapshot mode, for a moving scene or a scene with a relatively low signal-to-noise ratio in which a sharp image is not easy to photograph, a photo with high sharpness can be photographed using the solutions, thereby improving a user's photographing experience.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

In the embodiments of the present disclosure, a terminal may be a device that provides photographing and/or data connectivity for a user, a handheld device with a wireless connection function, or another processing device connected to a wireless modem, such as a digital camera, a single-lens reflex camera, a mobile phone (or referred to as a "cellular" phone), or may be a portable, pocket-sized, handheld, or wearable device (such as a smartwatch), a tablet computer, a personal computer (PC), a personal digital assistant (PDA), a point of sale (POS), an in-vehicle computer, an unmanned aerial vehicle, a camera drone, or the like.

Figure 1:
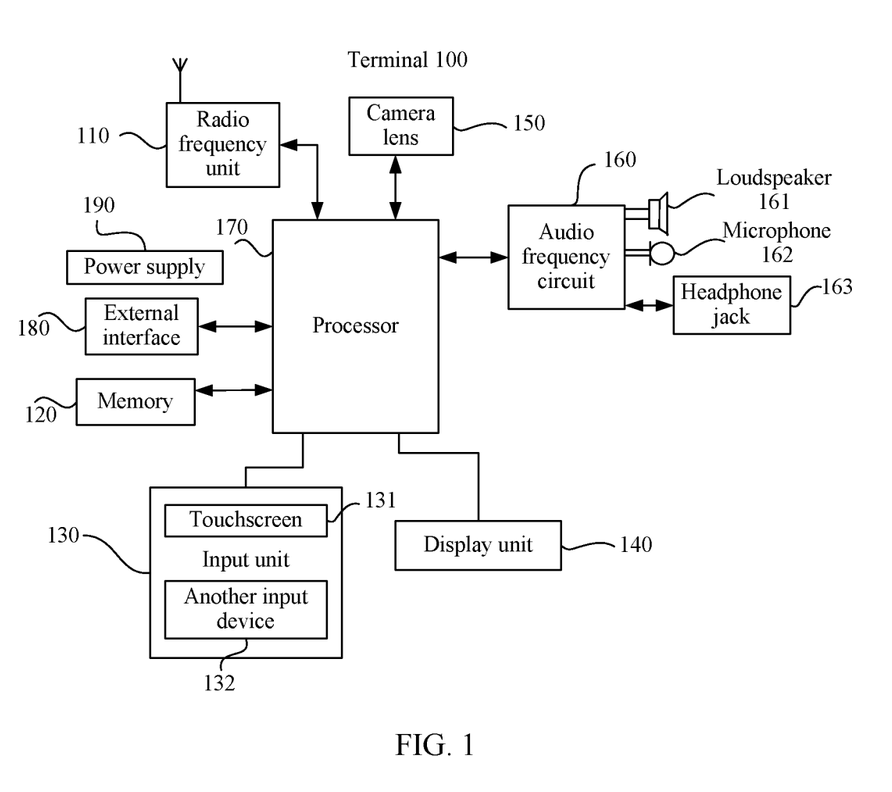
FIG. 1 is a schematic structural diagram of a terminal.

FIG. 1 is a schematic diagram of an optional hardware structure of a terminal 100.

As shown in FIG. 1, the terminal 100 may include components such as a radio frequency unit 110, a memory 120, an input unit 130, a display unit 140, a camera lens 150, an audio frequency circuit 160, a speaker 161, a microphone 162, a processor 170, an external interface 180, and a power supply 190. In this embodiment of the present disclosure, there are at least two camera lenses 150.

The camera lens 150 is configured to collect an image or a video and may be enabled through a trigger of an application program instruction, to implement a photo or video photographing function. The camera lens may include components such as an imaging lens, a light filter, an image sensor, and a motor for focusing and optical image stabilization. Light rays emitted or reflected by an object enter the imaging lens and finally converge on the image sensor through the light filter. The imaging lens is mainly configured to converge light emitted or reflected by all objects in a photographing view (which may also be referred to as subjects to be photographed) for imaging. The light filter is mainly configured to filter out redundant light waves (for example, a light wave other than visible light, such as infrared) from light rays. The image sensor is mainly configured to perform optical-to-electrical conversion on a received optical signal to obtain an electrical signal, and input the electrical signal to the processor 170 for subsequent processing.

Figure 2:
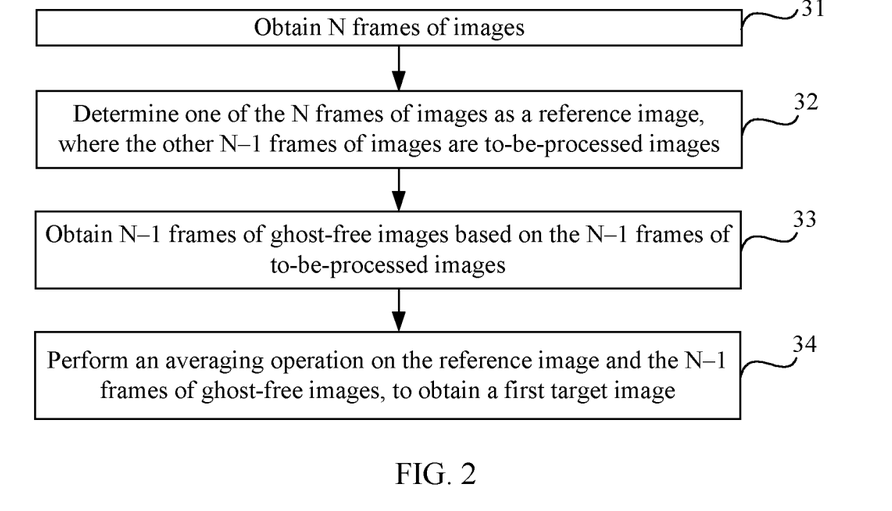
FIG. 2 is a flowchart of an image processing method according to an embodiment of the present disclosure.

A person skilled in the art may understand that FIG. 2 is merely an example of a portable multifunctional apparatus and constitutes no limitation on the portable multifunctional apparatus. The terminal may include more or fewer components than shown in the figure, or combine some components, or have different components.

The input unit 130 may be configured to receive entered digit or character information, and generate a key signal input related to user settings and function control of the portable multifunctional apparatus. Specifically, the input unit 130 may include a touchscreen 131 and another input device 132. The touchscreen 131 may collect a touch operation (for example, an operation performed by a user on the touchscreen or near the touchscreen using any proper object such as a finger, a joint, or a stylus) of the user on or near the touchscreen, and drive a corresponding connection apparatus according to a preset program. The touchscreen may detect a touch action of the user on the touchscreen, convert the touch action into a touch signal, send the touch signal to the processor 170, and can receive and execute a command sent by the processor 170. The touch signal includes at least touch point coordinate information. The touchscreen 131 may provide an input interface and an output interface between the terminal 100 and the user. In addition, the touchscreen may be implemented in various types such as a resistive type, a capacitive type, an infrared type, and a surface acoustic wave type. In addition to the touchscreen 131, the input unit 130 may further include the other input device. Specifically, the other input device 132 may include but is not limited to one or more of a physical keyboard, a function key (such as a volume control key or a power on/off key), a trackball, a mouse, a joystick, and the like.

The display unit 140 may be configured to display information entered by the user or information provided for the user, and various menus of the terminal 100. In this embodiment of the present disclosure, the display unit is further configured to display an image obtained by the terminal using the camera lens 150, including a preview image, an initial image that is photographed, and a target image that is obtained after being photographed and processed using a specific algorithm.

Further, the touchscreen 131 may cover a display panel 141. After detecting a touch operation on or near the touchscreen 131, the touchscreen 131 transfers the touch operation to the processor 170 to determine a type of a touch event. Then the processor 170 provides a corresponding visual output on the display panel 141 based on the type of the touch event. In this embodiment, the touchscreen and the display unit may be integrated into one component to implement input, output, and display functions of the terminal 100. For ease of description, in this embodiment of the present disclosure, a touch display screen represents a function set of the touchscreen and the display unit. In some embodiments, the touchscreen and the display unit may alternatively be used as two independent components.

The memory 120 may be configured to store an instruction and data. The memory 120 may mainly include an instruction storage area and a data storage area. The data storage area may store an association relationship between a joint touch gesture and an application program function. The instruction storage area may store software units such as an operating system, an application, and an instruction required by at least one function, or a subset and an extension set of the software units. The memory 120 may further include a non-volatile random access memory, and provide the processor 170 with hardware, software, and data resources for managing a computing processing device, to support control of software and an application. The memory 120 is further configured to store a multimedia file, and store an execution program and an application.

The processor 170 is a control center of the terminal 100, and is connected to various parts of an entire mobile phone through various interfaces and lines. The processor 170 performs various functions of the terminal 100 and processes data by running or executing the instruction stored in the memory 120 and invoking the data stored in the memory 120, to perform overall monitoring on the mobile phone. Optionally, the processor 170 may include one or more processing units. Preferably, the processor 170 may be integrated with an application processor and a modem processor. The application processor mainly processes an operating system, a user interface, an application program, and the like. The modem processor mainly processes wireless communication. It may be understood that alternatively, the modem processor may not be integrated into the processor 170. In some embodiments, the processor and the memory may be implemented on a single chip. In some embodiments, the processor and the memory may be separately implemented on independent chips. The processor 170 may be further configured to generate a corresponding operation control signal, send the operation control signal to a corresponding component of the computing processing device, and read and process data in software, especially the data and program in the memory 120 such that each function module in the computing processing device performs a corresponding function, to control the corresponding component to perform an action as required by an instruction.

The radio frequency unit 110 may be configured to receive and send information, or receive and send a signal during a call, and particularly, receive downlink information of a base station and then send the downlink information to the processor 170 for processing. In addition, the radio frequency unit 110 is configured to send uplink data of the mobile phone to the base station. Generally, the radio frequency (RF) circuit includes but is not limited to an antenna, at least one amplifier, a transceiver, a coupler, a low noise amplifier (LNA), a duplexer, or the like. In addition, the radio frequency unit 110 may further communicate with a network device and another device through wireless communication. The wireless communication may use any communications standard or protocol, including but not limited to a GSM, a general packet radio service (GPRS), CDMA, WCDMA, LTE, email, a short message service (SMS), or the like.

The audio frequency circuit 160, the speaker 161, and the microphone 162 may provide an audio interface between the user and the terminal 100. The audio frequency circuit 160 may transmit, to the speaker 161, an electrical signal converted from received audio data, and the speaker 161 converts the electrical signal into a sound signal for outputting. On the other hand, the microphone 162 is configured to collect a sound signal, and may further convert the collected sound signal into an electrical signal. The audio frequency circuit 160 receives the electrical signal, converts the electrical signal into audio data, outputs the audio data to the processor 170 for processing, and then sends the audio data to, for example, another terminal through the radio frequency unit 110, or the audio data is output to the memory 120 for further processing. The audio frequency circuit may also include a headphone jack 163 configured to provide a connection interface between the audio frequency circuit and a headset.

The terminal 100 further includes the power supply 190 (such as a battery) that supplies power to each component. Preferably, the power supply may be logically connected to the processor 170 using a power supply management system, to implement functions such as charging and discharging management and power consumption management using the power supply management system.

The terminal 100 further includes the external interface 180. The external interface may be a standard micro-universal serial bus (USB) port, or may be a multi-pin connector. The external interface may be configured to connect the terminal 100 to another apparatus for communication, or may be configured to connect to a charger to charge the terminal 100.

Although not shown, the terminal 100 may further include a flash, a WI-FI module, a BLUETOOTH module, various sensors, and the like. Details are not described herein. All of the methods described below may be applied to the terminal shown in FIG. 1.

As shown in FIG. 2, an embodiment of the present disclosure provides an image processing method. A specific processing method procedure includes the following steps.

Step 31. Obtain N frames of images, where N is a positive integer greater than 2.

Step 32. Determine one of the N frames of images as a reference image, where the other N−1 frames of images are to-be-processed images. For example, N is 20, the first frame of image is a reference image, the other 19 frames of images are to-be-processed images, and i in step 33 may be any one of 1 to 19.

Step 33. Obtain N−1 frames of ghost-free images based on the N−1 frames of to-be-processed images. Specifically, steps s331 to s334 may be performed on an $i^{th}$ frame in the N−1 frames, where values of i may be all positive integers that are not greater than N−1. In some embodiments, alternatively, only M frames of to-be-processed images may be used to obtain M frames of ghost-free images, where M is a positive integer less than N−1. Still using N−1 for description, refer to FIG. 3.

Figure 3:
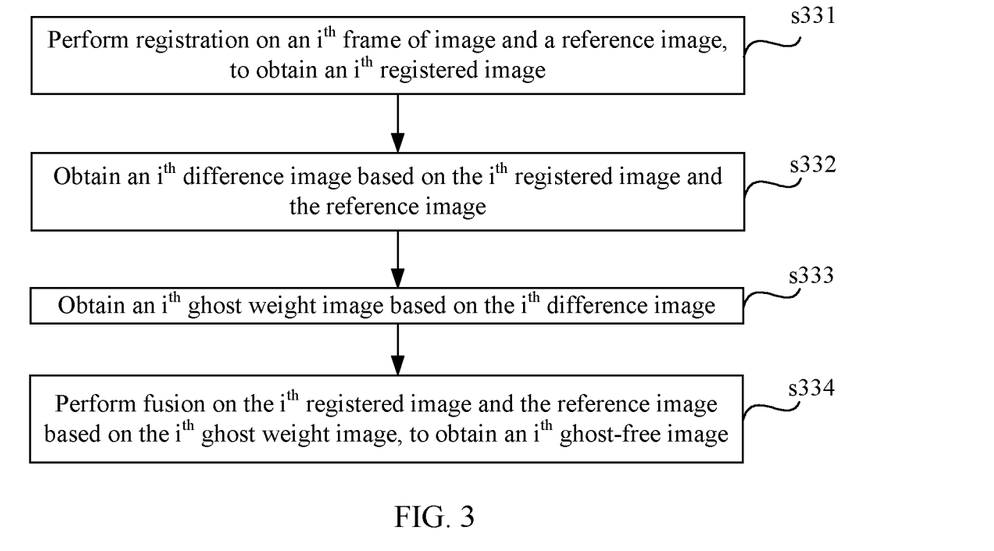
FIG. 3 is a flowchart of a ghost removal method for an image according to an embodiment of the present disclosure.

S331. Perform registration on the $i^{th}$ frame of image and the reference image, to obtain an $i^{th}$ registered image.

S332. Obtain an $i^{th}$ difference image based on the $i^{th}$ registered image and the reference image.

S333. Obtain an $i^{th}$ ghost weight image based on the $i^{th}$ difference image.

S334. Perform fusion on the $i^{th}$ registered image and the reference image based on the $i^{th}$ ghost weight image, to obtain an $i^{th}$ frame of ghost-free image.

Step 34. Obtain a first target image based on the reference image and the N−1 frames of ghost-free images. Specifically, an averaging operation is performed on the reference image and the N−1 frames of ghost-free images, to obtain the first target image, and the averaging operation may also include some modifications to an average value, or include an average value of absolute values, or the like.

If a camera of a terminal is directly in a snapshot mode, in step 31, N images are photographed consecutively in current parameter settings after a photographing instruction is received, and this may be used as a replacement for step 31 in the following first snapshot mode, second snapshot mode, and third snapshot mode. Specifically, according to a choice of a user, the terminal directly enters a snapshot mode, for example, the first snapshot mode, the second snapshot mode, or the third snapshot mode that is to be mentioned below. In this case, the terminal does not need to detect an environment of a to-be-photographed scene, because there is a preset parameter rule (prestored locally in the terminal or a cloud server) for each snapshot mode. In an embodiment, each snapshot mode has corresponding ISO sensitivity and a corresponding exposure time, and certainly, there may be other performance parameters or the like. Upon entering a particular snapshot mode, the camera automatically adjusts to corresponding ISO sensitivity and a corresponding exposure time to photograph. Therefore, if the user directly uses the snapshot mode, the obtaining N images may be photographing the N images using the ISO sensitivity and the exposure time corresponding to the snapshot mode, to perform subsequent image processing of the corresponding mode.

Figure 4:
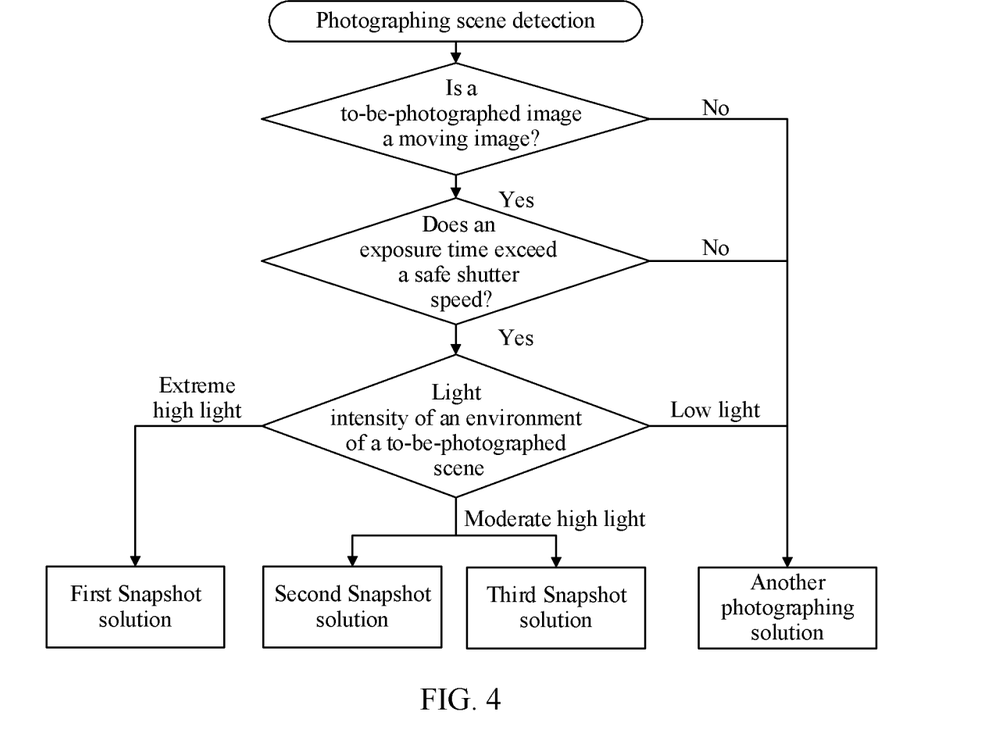
FIG. 4 is a flowchart of a snapshot system according to an embodiment of the present disclosure.

If the camera of the terminal is in an auto mode or a smart mode, the camera needs to detect an environment of a to-be-photographed scene. If it is detected that a to-be-photographed image of the camera is a moving image, and that a current exposure time of the camera exceeds a safe time, and that the environment of the to-be-photographed scene is an extreme high-light environment, the first snapshot mode provided in the present disclosure is used. If it is detected that a to-be-photographed image of the camera is a moving image, and that a current exposure time of the camera exceeds a safe time, and that the environment of the to-be-photographed scene is a moderate high-light environment, the second snapshot mode or the third snapshot mode provided in the present disclosure is used. If none of the foregoing cases are detected, any one of the photographing modes supported by the terminal may be used to photograph. For a specific photographing procedure, refer to FIG. 4.

The "camera" in this specification generally refers to a system in a terminal device capable of implementing a photographing function, and the system includes a camera lens and a necessary processing module and storage module to obtain and transfer an image, and may further include some processing function modules.

The "current exposure time" and "current ISO sensitivity" are respectively a corresponding exposure time and corresponding ISO sensitivity when the camera previews a data stream of the to-be-photographed image in initial conditions, and usually are related to properties and initial settings of the camera. In a possible design, if the terminal does not detect the environment of the to-be-photographed scene of the camera, or detects none of the following three cases when detecting the environment of the to-be-photographed scene, a corresponding exposure time and corresponding ISO sensitivity when the camera previews a data stream of the to-be-photographed image are also considered as the "current exposure time" and "current ISO sensitivity", and case 1 the to-be-photographed image of the camera is a moving image, case 2 it is detected that the current exposure time of the camera exceeds a safe time, and case 3 it is detected that the environment of the to-be-photographed scene is an extreme high-light environment or a moderate high-light environment.

There are many manners of detecting whether the to-be-photographed image is a moving image. For example, motion detection is performed on a preview data stream to analyze a photographing preview stream, detection is performed every x frames (a quantity x of interval frames is variable, and x is a positive integer), and a difference between a current frame of image detected and a previous frame of image detected is analyzed during each time of detection. Specifically, the two frames of images each may be divided into areas in a same division manner, for example, 64 areas per frame of image. If a relatively big difference exists in one or more than one area, the image is considered as a moving image.

The current exposure time and a safe shutter speed may be obtained by obtaining camera parameters. The safe shutter speed is a property of a terminal camera. Generally, a snapshot mode is considered only when the current exposure time is greater than the safe shutter speed.

It is highly required to detect light intensity in a photographing environment. In an environment with higher light, sharpness of an image is higher and subsequent processing required is simpler. An extreme high-light scene is defined as follows. ISO sensitivity (denoted as ISO) and an exposure time (denoted as expo) of a preview image are less than a threshold each, that is, ISO<iso_th1 and expo<expo_th1. ISO and expo of the preview image may be obtained by obtaining camera parameters, and iso_th1 and expo_th1 may be determined based on the user's specific requirements. A moderate high-light scene is defined as follows iso_th1≤ISO<iso_th2 and expo_th1≤expo<expo_th2. Likewise, iso_th2 and expo_th2 may also be determined based on the user's specific requirements. A low-light scene is defined as follows iso_th2≤ISO and expo_th2≤expo. It should be understood that division of the intervals is determined based on a user requirement, and it is allowable that the value intervals are discontinuous or overlap.

The following describes the first snapshot mode, the second snapshot mode, and the third snapshot mode in detail.

First Snapshot Mode

For a flowchart of the first snapshot mode, refer to FIG. 2 and FIG. 3.

Step 31 is obtaining parameters such as current ISO sensitivity and a current exposure time of a camera, with a product of the current ISO sensitivity and the current exposure time of the camera unchanged, reducing the exposure time and increasing the ISO sensitivity at a preset ratio, to obtain a first exposure time and first ISO sensitivity, for example, the first exposure time being ½ or ¼ of the original exposure time and the first ISO sensitivity being two or four times of the original ISO sensitivity, where a specific ratio may be adjusted according to a requirement of a user or a specified rule, and setting the exposure time and the ISO sensitivity of the camera to the first exposure time and the first ISO sensitivity respectively, and photographing N frames of images. The following step is performing noise reduction on the N frames of images.

In a possible design, a photographing action may be triggered by the user pressing a shutter button. In one case, before the user presses the shutter button, the current exposure time and the current ISO sensitivity of the camera are already adjusted to the first exposure time and the first ISO sensitivity, and when the user presses the shutter button, the camera photographs the N images using the first exposure time and the first ISO sensitivity, for subsequent processing. In another case, before the user presses the shutter button, the camera still maintains the current ISO sensitivity and the current exposure time, and when the user presses the shutter button, the current exposure time and the current ISO sensitivity of the camera are adjusted to the first exposure time and the first ISO sensitivity, and the camera photographs the N images using the first exposure time and the first ISO sensitivity, for subsequent processing. In addition, in a preview image data stream, the image may be displayed with the current ISO sensitivity and the current exposure time, or may be displayed with the first exposure time and the first ISO sensitivity.

Step 32 is determining one of the N frames of images as a reference image, where the other N−1 frames of images are to-be-processed images. For example, the first frame of image or a frame of image in the middle of the N frames of images is used as the reference image. The first frame of image is used as an example for description of the following steps.

Step 33 is obtaining N−1 frames of ghost-free images based on the N−1 frames of to-be-processed images. This step may be further divided into many sub-steps. Steps s331 to s334 may be performed on an $i^{th}$ frame in the other N−1 frames, where values of i may be all positive integers that are not greater than N−1. In a specific implementation process, alternatively, some of the N−1 frames may be selected to obtain some frames of ghost-free images. For ease of description, all of the N−1 frames are selected to obtain ghost-free images in this embodiment.

S331 is performing registration on the $i^{th}$ frame of image and the reference image, to obtain an $i^{th}$ registered image. A specific registration method may be (1) performing feature extraction on the $i^{th}$ frame of image and the reference image in a same manner, to obtain a series of feature points, and making a feature description for each feature point, (2) matching feature points of the $i^{th}$ frame of image and the reference image, to obtain a series of feature point pairs, and eliminating outliers using a random sample consensus (RANSAC) algorithm (other approaches), and (3) solving for a transformation matrix (for example, a homography matrix or an affine matrix) of the two images from the matched feature point pairs, and performing registration and alignment, based on the transformation matrix, on the $i^{th}$ frame image and the reference image to obtain the $i^{th}$ frame of registered image. For this step, there is already a mature open-source algorithm available for invocation at the present stage, and therefore details are not described herein.

S332 is obtaining an $i^{th}$ difference image based on the $i^{th}$ registered image and the reference image. Further, differences between the $i^{th}$ frame of registered image and the reference image are calculated pixel by pixel, and a difference image of the two images is obtained by taking an absolute value of each value.

S333 is obtaining an $i^{th}$ ghost weight image based on the $i^{th}$ difference image. Further, a pixel exceeding a preset threshold in the difference image is set to M (for example, 255), a pixel not exceeding the preset threshold is set to N (for example, 0), and Gaussian smoothing is performed on the difference image after reassignment, to obtain the $i^{th}$ ghost weight image.

S334 is performing fusion on the $i^{th}$ registered image and the reference image based on the $i^{th}$ ghost weight image, to obtain an $i^{th}$ frame of ghost-free image. Further, based on the ghost weight image (ghost_mask in the following formula), pixel-by-pixel fusion is performed on the $i^{th}$ frame of registered image (image_i in the following formula) and the reference image (image_1 in the following formula), to obtain the $i^{th}$ frame of ghost-free image (no_ghost_mask). A fusion formula is as follows, where m and n represent pixel coordinates $$\text{no\_ghost\_image\_i}_{m,n} = \frac{\text{image\_1}_{m,n} * \text{ghost\_mask}_{m,n} + \text{image\_i}_{m,n} * (M - \text{ghost\_mask}_{m,n})}{M}.$$

Step 34 is performing an averaging operation on the reference image and the N−1 frames of ghost-free images, to obtain a first target image. For example, a pixel averaging algorithm or the like in the industry may be used. The first target image is a final image obtained when the terminal executes the photographing mode.

Second Snapshot Mode

The second snapshot mode is more complex than the first snapshot mode. Some steps are the same as the method of the snapshot mode 1. For a flowchart of the second snapshot mode, refer to FIG. 5.

Figure 5:
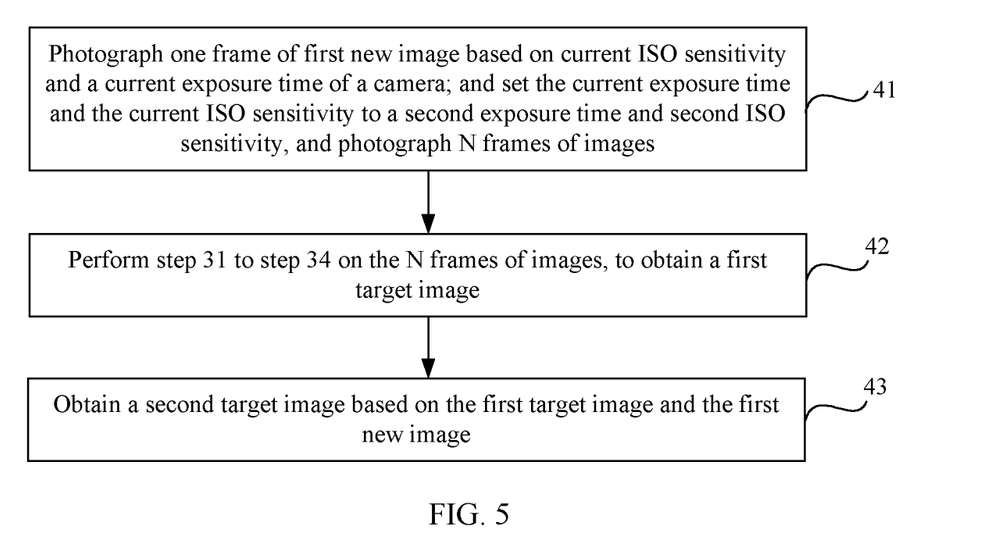
FIG. 5 is a schematic diagram of another image processing method according to an embodiment of the present disclosure.

Step 41. Photograph one frame of first new image based on current ISO sensitivity and a current exposure time of a camera, with a product of the current ISO sensitivity and the current exposure time, reduce the exposure time and increase the ISO sensitivity at a preset ratio, to obtain a second exposure time and second ISO sensitivity, and set the exposure time and the ISO sensitivity of the camera to the second exposure time and the second ISO sensitivity respectively, and photograph N frames of images.

In a possible design, a photographing action may be triggered by a user pressing a shutter button. In one case, when the user presses the shutter button, one frame of first new image is obtained using the current ISO sensitivity and the current exposure time, the current exposure time and the current ISO sensitivity are adjusted to the second exposure time and the second ISO sensitivity, and the N images are photographed in this condition, and N+1 images are obtained in total, for subsequent processing. In another case, when the user presses the shutter button, the current exposure time and the current ISO sensitivity are set to the second exposure time and the second ISO sensitivity, and the N images are photographed in this condition, then one frame of first new image is obtained still using the current ISO sensitivity and the current exposure time, and N+1 images are obtained in total, for subsequent processing. In addition, in a preview image data stream, the image may be displayed with the current ISO sensitivity and the current exposure time, or may be displayed with the second exposure time and the second ISO sensitivity.

Step 42. Obtain a first target image using the solution of the first snapshot mode (step 31 to step 34) for the N frames of images obtained in the previous step. It should be understood that the second ISO sensitivity, the second exposure time, and some of the foregoing adjustable thresholds may vary accordingly with a scene.

Step 43. Obtain a second target image based on the first target image and the first new image. In a specific implementation process, step 43 may include but is not limited to the following two implementations.

Manner (1) for step 43.

S4311. Perform registration on the first new image and a reference image (the same as the reference image selected when the first target image is obtained), to obtain a first registered image.

S4312. Obtain a first difference image based on the first registered image and the first target image.

S4313. Obtain a first ghost weight image based on the first difference image.

S4314. Perform fusion on the first registered image and the first target image based on the first ghost weight image, to obtain a first ghost-free image.

S4315. Perform pixel-value weighted fusion based on the first ghost-free image and the first target image, to obtain the second target image. Further, the fusion may include four implementations time domain fusion s4315(1), time domain fusion s4315(3), frequency domain fusion s4315(2), and frequency domain fusion s4315(4).

Time domain fusion s4315(1). Guided filtering is separately performed on the first target image and the first ghost-free image, to filter out short-frame information (an existing mature algorithm), where the first target image and the first ghost-free image after the guided filtering is performed are denoted as fusion_gf and noghost_gf. Pixel-value weighted fusion is performed on fusion_gf and noghost_gf. A specific fusion formula is as follows $$\text{Fusion}_{m,n} = \frac{\text{fusion\_gf}_{m,n} + \text{noghost\_gf}_{m,n} + W_{m,n} * (\text{fusion\_gf}_{m,n} - \text{noghost\_gf}_{m,n})}{2}$$

$$W_{m,n} = \frac{(\text{fusion\_gf}_{m,n} - \text{noghost\_gf}_{m,n})^2}{(\text{fusion\_gf}_{m,n} - \text{noghost\_gf}_{m,n})^2 + v}$$

where v is magnitude of corresponding noise specified according to a current ISO stop, and is a constant, W is a weight, and a value range of W is [0, 1).

Target details are added back to a fused image pixel by pixel. For any pixel, a target detail is a larger value of details that are filtered out from the first target image and the first ghost-free image during guided filtering at the pixel, to add more image details, thereby obtaining the second target image.

Time domain fusion s4315(3). Downsampling is separately performed on the first target image (denoted as fusion) and the first ghost-free image (denoted as noghost), and both a width and a height are downsampled by two times, to separately obtain a downsampled image of the first target image and a downsampled image of the first ghost-free image, where the two downsampled images are denoted as fusion×4 and noghost×4 respectively. Then upsampling is performed on fusion×4 and noghost×4, and both a width and a height are upsampled by two times, to separately obtain two images that are consistent in size with those before sampling is performed, where the two images are denoted as fusion' and noghost'. Differences between fusion and fusion' are calculated pixel by pixel, to obtain a sampling error image of the first target image, where the sampling error image is denoted as fusion_se. Differences between noghost and noghost' are calculated pixel by pixel, to obtain a sampling error image of the first ghost-free image, where the sampling error image is denoted as noghost_se. Guided filtering (an existing mature algorithm) is separately performed on fusion×4 and noghost×4, to obtain two filtered images, where the two filtered images are denoted as fusion_gf and noghost_gf. A pixel-value weighted fusion is performed on fusion_gf and noghost_gf to obtain a fused image, which is denoted as Fusion. A specific fusion formula is the same as the formula in s4315(1). Details that are filtered out from the first target image during guided filtering are added back to the fused image pixel by pixel, upsampling is performed on the image, and both a width and a height are upsampled by two times, where the upsampled image is denoted as FusionUp. A larger value is selected pixel by pixel from the two sampling error images fusion_se and noghost_se, and is added pixel by pixel to FusionUp, to add more image details, thereby obtaining the second target image.

Frequency domain fusion s4315(2). Guided filtering (an existing mature algorithm) is separately performed on the first target image and the first ghost-free image. Fourier transform is separately performed on the two filtered images, and corresponding amplitudes are calculated. A ratio of the amplitudes is used as a weight, and Fourier spectrums corresponding to the two images are fused. A specific fusion formula is similar to that for time domain fusion. Inverse Fourier transform is performed on the fused spectrum to obtain a fused image. Target details are added back to a fused image pixel by pixel. For any pixel, a target detail is a larger value of details that are filtered out from the first target image and the first ghost-free image during guided filtering at the pixel, to add more image details, thereby obtaining the second target image.

Frequency domain fusion s4315(4). Downsampling is separately performed on the first target image (denoted as fusion) and the first ghost-free image (denoted as noghost), and both a width and a height are downsampled by two times, to separately obtain a downsampled image of the first target image and a downsampled image of the first ghost-free image, where the two downsampled images are denoted as fusion×4 and noghost×4 respectively. Then upsampling is performed on fusion×4 and noghost×4, and both a width and a height are upsampled by two times, to separately obtain two images that are consistent in size with those before sampling is performed, where the two images are denoted as fusion' and noghost'. Differences between fusion and fusion' are calculated pixel by pixel, to obtain a sampling error image of the first target image, where the sampling error image is denoted as fusion_se. Differences between noghost and noghost' are calculated pixel by pixel, to obtain a sampling error image of the first ghost-free image, where the sampling error image is denoted as noghost_se. Guided filtering (an existing mature algorithm) is separately performed on fusion×4 and noghost×4, and two filtered images are denoted as fusion_gf and noghost_gf. Fourier transform is separately performed on the two filtered images, and corresponding amplitudes are calculated. A ratio of the amplitudes is used as a weight, and Fourier spectrums corresponding to the two images are fused. A specific fusion formula is similar to that for time domain fusion. Inverse Fourier transform is performed on the fused spectrum to obtain a fused image. Details that are filtered out from the first target image during guided filtering are added back to the fused image pixel by pixel, and upsampling of two times in both a width and a height is performed on the image to which details are added back, where the upsampled image is denoted as FusionUp. A larger value is selected pixel by pixel from the two sampling error images fusion_se and noghost_se, and is added pixel by pixel to FusionUp, to add more image details, thereby obtaining the second target image.

A specific algorithm used in s4311 to s4314 is the same as that used in s331 to s334, and a difference mainly lies in a replacement of an input image. Details are not described herein again.

Manner (2) for step 43.

S4321. Perform registration on the first new image and the first target image, to obtain a second registered image.

S4322. Obtain a second difference image based on the second registered image and the first target image.

S4323. Obtain a second ghost weight image based on the second difference image.

S4324. Perform fusion on the second registered image and the first target image based on the second ghost weight image, to obtain a second ghost-free image.

S4325. Perform pixel-value weighted fusion based on the second ghost-free image and the first target image, to obtain the second target image. Further, the fusion may include two implementations time domain fusion and frequency domain fusion, and refer to any one of the foregoing time domain fusion s4315(1) and s4315(3), and frequency domain fusion s4315(2) and s4315(4). An algorithm is the same except for a replacement of an input image, and details are not described herein again.

Third Snapshot Mode

The third snapshot mode is more complex than the first snapshot mode, and may be understood as a replacement for the second snapshot mode in a sense. The second and the third snapshot modes are usually used in a moderate highlight scene. For a flowchart of the third snapshot mode, refer to FIG. 6.

Figure 6:
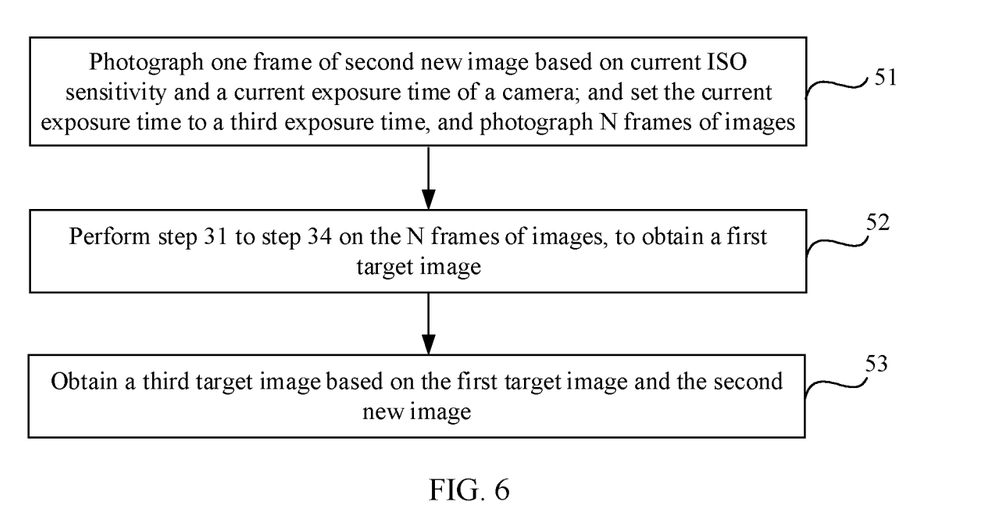
FIG. 6 is a schematic diagram of another image processing method according to an embodiment of the present disclosure.

Step 51. Photograph one frame of second new image based on current ISO sensitivity and current exposure time of a camera, and with the current ISO sensitivity of the camera unchanged, set the current exposure time to a third exposure time that is shorter, and photograph N frames of images.

In a possible design, a photographing action may be triggered by a user pressing a shutter button. In one case, when the user presses the shutter button, one frame of second new image is obtained using the current ISO sensitivity and the current exposure time, with the current ISO sensitivity of the camera unchanged, the current exposure time is set to the third exposure time that is shorter, and the N images are photographed in this condition, and N+1 images are obtained in total, for subsequent processing. In another case, when the user presses the shutter button, the current exposure time is set to the third exposure time that is shorter, and the N images are photographed in this condition, then one frame of second new image is obtained still using the current ISO sensitivity and the current exposure time, and N+1 images are obtained in total, for subsequent processing. In addition, in a preview image data stream, the image may be displayed with the current ISO sensitivity and the current exposure time, or may be displayed with the third exposure time and the current ISO sensitivity.

Step 52. Obtain a first target image using the solution of the first snapshot mode (step 31 to step 34) for the N frames of images obtained in the previous step. It should be understood that the third exposure time and some adjustable thresholds may vary accordingly with a scene.

Step 53. Obtain a third target image based on the first target image and the second new image. In a specific implementation process, step 53 may include but is not limited to the following two implementations.

Manner (1) for step 53.

S5311. Perform luminance correction on the first target image based on the second new image, to obtain a fourth target image. Further, statistics about histograms of the second new image and the first target image are separately collected, and statistics about cumulative histograms are collected based on the histograms, the cumulative histogram of the first target image is mapped to the cumulative histogram of the second new image, to obtain a mapping relationship curve, smoothing is performed on the mapping relationship curve, to prevent the curve from being convex or concave with a relatively large slope, and luminance of the first target image is increased based on the mapping curve. The luminance correction algorithm is an existing mature algorithm, and details are not described.

S5312. Perform registration on the second new image and a reference image (the same as the reference image selected when the first target image is obtained), to obtain a third registered image.

S5313. Obtain a third difference image based on the third registered image and the fourth target image.

S5314. Obtain a third ghost weight image based on the third difference image.

S5315. Perform fusion on the third registered image and the fourth target image based on the third ghost weight image, to obtain a third ghost-free image.

S5316. Perform pixel-value weighted fusion based on the third ghost-free image and the fourth target image, to obtain a fifth target image. For a fusion algorithm, refer to any one of time domain fusion s4315(1), time domain fusion s4315(3), frequency domain fusion s4315(2), or frequency domain fusion s4315(4).

s5317 Perform pyramid fusion on the fifth target image and the first target image, to obtain the third target image. Further, Laplacian pyramids of the fifth target image and the first target image are separately built, a weight image of the image fusion is built, normalization and smoothing are performed on the weight image, and a Gaussian pyramid is built for the normalized and smoothed weight image, based on a weight setting of each level of pyramids, the pyramids of all the images are fused at the corresponding level to obtain a synthetic pyramid, starting from a top level of the Laplacian pyramid, the synthetic pyramid is rebuilt according to a reverse process of pyramid generation, and each level of information is added back one by one, to restore the fused image. Pyramid fusion processing is an existing mature algorithm, and details are not described.

For algorithms in s5312 to s5316, refer to corresponding s4311 to s4315. Details are not described herein.

Manner (2) for step 53.

S5321. Perform luminance correction on the first target image based on the second new image, to obtain a fourth target image. Further, statistics about histograms of the second new image and the first target image are separately collected, and statistics about cumulative histograms are collected based on the histograms, the cumulative histogram of the first target image is mapped to the cumulative histogram of the second new image, to obtain a mapping relationship curve, smoothing is performed on the mapping relationship curve, to prevent the curve from being convex or concave with a relatively large slope, and luminance of the first target image is increased based on the mapping curve. The luminance correction algorithm is an existing mature algorithm, and details are not described.

S5322. Perform registration on the second new image and a reference image (the same as the reference image selected when the first target image is obtained), to obtain a third registered image.

S5323. Obtain a third difference image based on the third registered image and the fourth target image.

S5324. Obtain a third ghost weight image based on the third difference image.

S5325. Perform fusion on the third registered image and the fourth target image based on the third ghost weight image, to obtain a third ghost-free image.

S5326. Perform pixel-value weighted fusion based on the third ghost-free image and the fourth target image, to obtain a fifth target image. For a fusion algorithm, refer to one of time domain fusion s4315(1), time domain fusion s4315(3), frequency domain fusion s4315(2), and frequency domain fusion s4315(4).

S5327. Perform pyramid fusion on the fifth target image and the first target image, to obtain the third target image. Further, Laplacian pyramids of the fifth target image and the first target image are separately built, a weight image of the image fusion is built, normalization and smoothing are performed on the weight image, and a Gaussian pyramid is built for the normalized and smoothed weight image, based on a weight setting of each level of pyramids, the pyramids of all the images are fused at the corresponding level to obtain a synthetic pyramid, starting from a top level of the Laplacian pyramid, the synthetic pyramid is rebuilt according to a reverse process of pyramid generation, and each level of information is added back one by one, to restore the fused image. Pyramid fusion processing is an existing mature algorithm, and details are not described.

For algorithms in s5322 to s5326, refer to corresponding s4321 to s4325. Details are not described herein.

The present disclosure provides an image processing method, and the method can provide a snapshot mode for the camera. Using the method, the user can snap a sharp image in different scenes, catering to the user's psychology of taking a snapshot, and the user can take a snapshot to record daily life anytime and anywhere, thereby greatly improving user experience.

Figure 7:
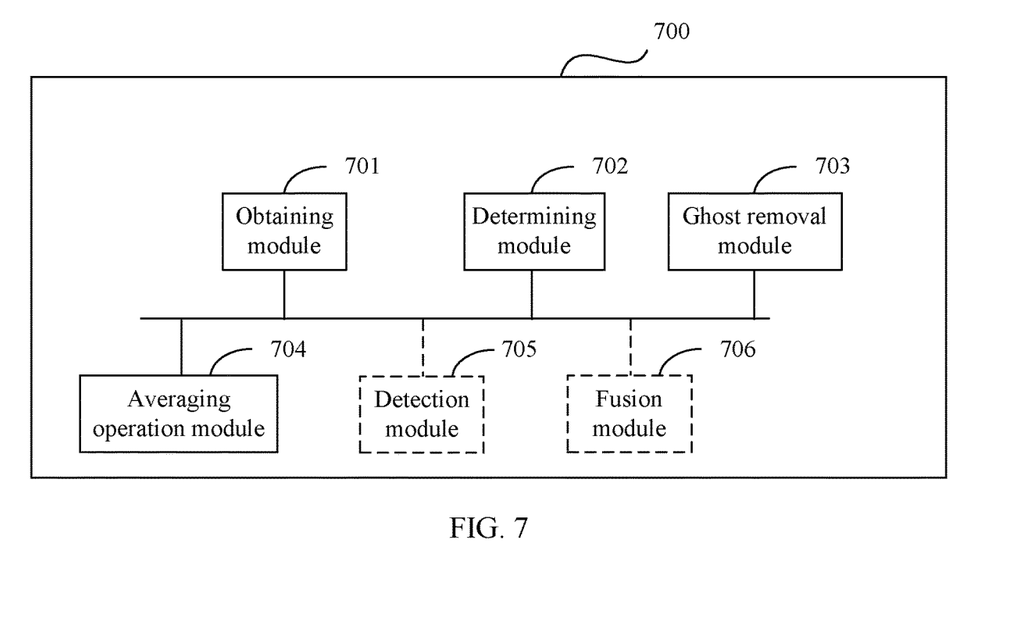
FIG. 7 is a schematic structural diagram of an image processing apparatus according to an embodiment of the present disclosure.

Based on the image processing methods provided in the foregoing embodiments, an embodiment of the present disclosure provides an image processing apparatus 700. The apparatus 700 may be applied to various photographing devices. As shown in FIG. 7, the apparatus 700 includes an obtaining module 701, a determining module 702, a ghost removal module 703, and an averaging operation module 704.

The obtaining module 701 is configured to obtain N frames of images. The obtaining module 701 may be implemented by a processor invoking a program instruction in a memory to control a camera lens to obtain the images.

The determining module 702 is configured to determine one of the N frames of images as a reference image, where the other N−1 frames of images are to-be-processed images. The determining module 702 may be implemented by the processor invoking a program instruction in the memory or an externally entered program instruction.

The ghost removal module 703 is configured to perform the following step 1 to step 4 on an $i^{th}$ frame of image in the N−1 frames of to-be-processed images, to obtain N−1 frames of ghost-free images, where values of i are all positive integers that are not greater than N−1, and step 1 perform registration on the $i^{th}$ frame of image and the reference image, to obtain an $i^{th}$ registered image, step 2 obtain an $i^{th}$ difference image based on the $i^{th}$ registered image and the reference image, step 3 obtain an $i^{th}$ ghost weight image based on the $i^{th}$ difference image, and step 4 perform fusion on the $i^{th}$ registered image and the reference image based on the $i^{th}$ ghost weight image, to obtain an $i^{th}$ frame of ghost-free image.

The ghost removal module 703 may be implemented by the processor, and may perform corresponding computing by invoking data and an algorithm in a local memory or a cloud server.

The averaging operation module 704 is configured to perform an averaging operation on the reference image and the N−1 frames of ghost-free images, to obtain a first target image. The averaging operation module 704 may be implemented by the processor, and may perform corresponding computing by invoking data and an algorithm in the local memory or the cloud server.

In a specific implementation process, the obtaining module 701 is further configured to perform the method mentioned in step 31 and a method that can be equivalently replaced, the determining module 702 is further configured to perform the method mentioned in step 32 and a method that can be equivalently replaced, the ghost removal module 703 is further configured to perform the method mentioned in step 33 and a method that can be equivalently replaced, and the averaging operation module 704 is further configured to perform the method mentioned in step 34 and a method that can be equivalently replaced. The foregoing specific method embodiments and explanations and descriptions in the embodiments are also applicable to method execution in the apparatus.

In a specific implementation process, the apparatus 700 further includes a detection module 705. The detection module 705 is configured to, when it is detected that the following three cases exist at the same time, control the obtaining module to obtain the N frames of images according to the following first obtaining manner, where case 1 it is detected that a to-be-photographed image of a camera is a moving image, case 2 it is detected that current exposure time of the camera exceeds a safe time, and case 3 it is detected that the camera is in an extreme high-light environment, that is, current ISO sensitivity is less than a first preset threshold and the current exposure time is less than a second preset threshold.

The first obtaining manner is, with a product of the current ISO sensitivity and the current exposure time of the camera unchanged, reducing the exposure time and increasing the ISO sensitivity at a preset ratio, to obtain a first exposure time and first ISO sensitivity, and setting the current exposure time and the current ISO sensitivity of the camera to the first exposure time and the first ISO sensitivity respectively, and photographing the N frames of images.

In a specific implementation process, the detection module 705 is configured to, when it is detected that the following three cases exist at the same time, control the obtaining module to obtain the N frames of images according to the following second or third obtaining manner, where case 1 it is detected that a to-be-photographed image of a camera is a moving image, case 2 it is detected that current exposure time of the camera exceeds a safe time, or case 3 it is detected that the camera is in a moderate high-light environment, that is, current ISO sensitivity is in a first preset threshold interval and the current exposure time is in a second preset threshold interval.

The second obtaining manner is, with a product of the current ISO sensitivity and the current exposure time of the camera unchanged, reducing the exposure time and increasing the ISO sensitivity at a preset ratio, to obtain a second exposure time and second ISO sensitivity, and setting the current exposure time and the current ISO sensitivity of the camera to the second exposure time and the second ISO sensitivity respectively, and photographing the N frames of images.

The third obtaining manner is photographing one frame of second new image based on the current ISO sensitivity and the current exposure time of the camera, and with the current ISO sensitivity of the camera unchanged, setting the current exposure time to a third exposure time that is shorter, and photographing the N frames of images.

The apparatus 700 may further include a fusion module 706 configured to obtain a second target image based on a first target image and the first new image, or configured to obtain a third target image based on the first target image and the second new image.

For example, the fusion module 706 is further configured to perform registration on the first new image and the reference image, to obtain a first registered image, obtain a first difference image based on the first registered image and the first target image, obtain a first ghost weight image based on the first difference image, perform fusion on the first registered image and the first target image based on the first ghost weight image, to obtain a first ghost-free image, and perform pixel-value weighted fusion based on the first ghost-free image and the first target image, to obtain the second target image. The fusion module 706 is further configured to perform the method mentioned in manner (1) for step 43 and a method that can be equivalently replaced.

Alternatively, the fusion module 706 is further configured to perform registration on the first new image and the first target image, to obtain a second registered image, obtain a second difference image based on the second registered image and the first target image, obtain a second ghost weight image based on the second difference image, perform fusion on the second registered image and the first target image based on the second ghost weight image, to obtain a second ghost-free image, and perform pixel-value weighted fusion based on the second ghost-free image and the first target image, to obtain the second target image. The fusion module 706 is further configured to perform the method mentioned in manner (2) for step 43 and a method that can be equivalently replaced.

Alternatively, the fusion module 706 is further configured to perform luminance correction on the first target image based on the second new image, to obtain a fourth target image, perform registration on the second new image and the reference image, to obtain a third registered image, obtain a third difference image based on the third registered image and the fourth target image, obtain a third ghost weight image based on the third difference image, perform fusion on the third registered image and the fourth target image based on the third ghost weight image, to obtain a third ghost-free image, perform pixel-value weighted fusion based on the third ghost-free image and the fourth target image, to obtain a fifth target image, and perform pyramid fusion on the fifth target image and the first target image, to obtain the third target image. The fusion module 706 is further configured to perform the method mentioned in manner (1) for step 53 and a method that can be equivalently replaced.

Alternatively, the fusion module 706 is further configured to perform luminance correction on the first target image based on the second new image, to obtain a fourth target image, perform registration on the second new image and the fourth target image, to obtain a fourth registered image, obtain a fourth difference image based on the fourth registered image and the fourth target image, obtain a fourth ghost weight image based on the fourth difference image, perform fusion on the fourth registered image and the fourth target image based on the fourth ghost weight image, to obtain a fourth ghost-free image, perform pixel-value weighted fusion based on the fourth ghost-free image and the fourth target image, to obtain a sixth target image, and perform pyramid fusion on the sixth target image and the first target image, to obtain the third target image. The fusion module 706 is further configured to perform the method mentioned in manner (2) for step 53 and a method that can be equivalently replaced.

According to a choice of a user, the terminal directly enters a snapshot mode, for example, the first snapshot mode, the second snapshot mode, or the third snapshot mode that is mentioned above. In this case, the terminal does not need to detect an environment of a to-be-photographed scene, because there is a preset parameter rule (prestored locally in the terminal or a cloud server) for each snapshot mode. In an embodiment, each snapshot mode has corresponding ISO sensitivity and a corresponding exposure time, and certainly, there may be other performance parameters or the like. Upon entering a particular snapshot mode, the obtaining module automatically adjusts to corresponding ISO sensitivity and a corresponding exposure time to photograph. Therefore, if the user directly uses the snapshot mode, the obtaining module photographs the N images using the corresponding ISO sensitivity and the corresponding exposure time, to perform subsequent image processing in a corresponding mode.

The foregoing detection module 705 and fusion module 706 may be implemented by the processor invoking a program instruction in the memory or a program instruction on a cloud.

The present disclosure provides the image processing apparatus 700. Using the apparatus or a terminal including the apparatus, the user can snap a sharp image in different scenes, catering to the user's psychology of taking a snapshot, and the user can take a snapshot to record daily life anytime and anywhere, thereby greatly improving user experience.

It should be understood that division of the modules in the foregoing apparatus 700 is merely division of logical functions, some or all of which may be integrated, in an embodiment, into one physical entity, or may be physically separated. For example, each of the foregoing modules may be a separate processing element, or may be integrated on a chip of a terminal, or may be stored in a storage element of a controller in a form of program code, and a processing element of the processor invokes and executes a function of each of the foregoing modules. In addition, the modules may be integrated or may be implemented independently. The processing element may be an integrated circuit chip and has a signal processing capability. In an implementation process, steps in the foregoing methods or the foregoing modules may be implemented using a hardware integrated logical circuit in the processor element, or using instructions in a form of software. The processing element may be a general-purpose processor, such as a central processing unit (CPU), or may be one or more integrated circuits configured to implement the foregoing methods, for example, one or more application-specific integrated circuits (ASIC), or one or more microprocessors (DSP), or one or more field programmable gate arrays (FPGA).

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact disc-read only memory (CD-ROM), an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Although embodiments of the present disclosure have been described, a person skilled in the art can make changes and modifications to these embodiments. Therefore, the following claims are intended to be construed as to cover the embodiments and all changes and modifications falling within the scope of the present disclosure. Apparently, a person skilled in the art can make various modifications and variations to the embodiments of the present disclosure without departing from the spirit and scope of the embodiments of the present disclosure. The present disclosure is intended to cover these modifications and variations provided that they fall within the scope of protection defined by the following claims and their equivalent technologies.

What is claimed is:

1. An image processing method, comprising:
 photographing one frame of a first new image based on a first International Organization of Standardization (ISO) sensitivity and a first exposure time of a camera;
 increasing the first ISO sensitivity to a second ISO sensitivity;

decreasing the first exposure time to a second exposure time, wherein a first product of the first ISO sensitivity and the first exposure time is equal to a second product of the second ISO sensitivity and the second exposure time;

photographing N frames of images using the second ISO sensitivity and the second exposure time; and obtaining a first target image based on the N frames of the images and the first new image, wherein obtaining the first target image based on the N frames of the images and the first new image comprises:

determining one of the N frames of the images as a reference image, wherein the other N−1 frames of the images are to-be-processed images;

obtaining N−1 frames of ghost-free images based on the to-be-processed images;

performing an averaging operation on the reference image and the N−1 frames of ghost-free images to obtain a second target image;

performing registration on the first new image and the reference image to obtain a first registered image; and     either:

obtaining a first difference image based on the first registered image and the second target image, obtaining a first ghost weight image based on the first difference image, performing fusion on the first registered image and the second target image to obtain a first ghost-free image, and performing pixel-value weighted fusion to obtain the first target image based on the first ghost-free image; or         performing luminance correction on the second target image to obtain a third target image, obtaining a second difference image based on the first registered image and the third target image, obtaining a second ghost weight image based on the second difference image, performing fusion on the first registered image and the third target image to obtain a second ghost-free image, performing pixel-value weighted fusion on the second ghost-free image and the third target image to obtain a fourth target image, and performing pyramid fusion on the fourth target image and the second target image to obtain the first target image.

2. The image processing method of claim 1, wherein before photographing the N frames of the images, the image processing method further comprises generating a control signal when a to-be-photographed image of the camera is a moving image, the first exposure time exceeds a safe time, or the first ISO sensitivity is in a first preset threshold interval and the first exposure time is in a second preset threshold interval, and wherein the control signal instructs the camera to photograph the N frames of the images.

3. The image processing method of claim 1, wherein performing fusion on the first registered image and the second target image to obtain the first ghost-free image, and performing pixel-value weighted fusion to obtain the first target image based on the first ghost-free image comprises:

performing fusion on the first registered image and the second target image to obtain the first ghost-free image based on the first ghost weight image; and     performing pixel-value weighted fusion to obtain the first target image based on the first ghost-free image and the first target image.

4. The image processing method of claim 1, wherein performing pixel-value weighted fusion to obtain the first target image based on the first ghost-free image comprises:

performing pixel-value weighted fusion on the second ghost-free image and the second target image to obtain the first target image.

5. An image processing apparatus, comprising:

a processor; and a memory coupled to the processor and storing instructions that, when executed by the processor, cause the image processing apparatus to be configured to:

photograph one frame of a first new image based on a first International Organization of Standardization (ISO) sensitivity and a first exposure time of a camera;

increase the first ISO sensitivity to a second ISO sensitivity;

decrease the first exposure time to obtain a second exposure time, wherein a first product of the first ISO sensitivity and the first exposure time is equal to a second product of the second ISO sensitivity and the second exposure time;

photograph N frames of images using the second ISO sensitivity and the second exposure time; and     obtain a first target image based on the N frames of the images and the first new image at least in part by:

determining one of the N frames of the images as a reference image, wherein the other N−1 frames of the images are to-be-processed images;

obtaining N−1 frames of ghost-free images based on the to-be-processed images;

performing an averaging operation on the reference image and the N−1 frames of ghost-free images to obtain a second target image;

performing registration on the first new image and the reference image to obtain a first registered image; and         either:

obtaining a first difference image based on the first registered image and the second target image, obtaining a first ghost weight image based on the first difference image, performing fusion on the first registered image and the second target image to obtain a first ghost-free image, and performing pixel-value weighted fusion to obtain the first target image; or             performing luminance correction on the second target image to obtain a third target image, obtaining a second difference image based on the first registered image and the third target image, obtaining a second ghost weight image based on the second difference image, performing fusion on the first registered image and the third target image to obtain a second ghost-free image, performing pixel-value weighted fusion on the second ghost-free image and the third target image to obtain a fourth target image, and performing pyramid fusion on the fourth target image and the second target image to obtain the first target image.

6. The image processing apparatus of claim 5, wherein the instructions further cause the image processing apparatus to be configured to control obtaining of the N frames of the images when a to-be-photographed image of the camera is a moving image, the first exposure time exceeds a safe time, or the first ISO sensitivity is in a first preset threshold interval and the first exposure time is in a second preset threshold interval.

7. The image processing apparatus of claim 5, wherein the instructions further cause the image processing apparatus to be configured to:
perform fusion on the first registered image and the second target image to obtain the first ghost-free image based on the first ghost weight image; and
perform pixel-value weighted fusion to obtain the first target image based on the first ghost-free image and the second target image.

8. The image processing apparatus of claim 5, wherein the instructions further cause the image processing apparatus to be configured to:
perform pixel-value weighted fusion on the second ghost-free image and the second target image to obtain the first target image.

9. A terminal device, comprising:
an image processing apparatus comprising:
  a processor; and
  a memory coupled to the processor and storing instructions that, when executed by the processor, cause the terminal device to be configured to:
    photograph one frame of a first new image based on current International Organization of Standardization (ISO) sensitivity and current exposure time of a camera;
    reduce the current exposure time and increasing the current ISO sensitivity at a preset ratio to obtain a second exposure time and a second ISO sensitivity with a product of the current ISO sensitivity and the current exposure time unchanged;
    set the current exposure time and the current ISO sensitivity to the second exposure time and the second ISO sensitivity respectively;
    photograph N frames of a plurality of images; and
    obtain a first target image based on the N frames of the images and the first new image at least in part by:
      determining one of the N frames of the images as a reference image, wherein the other N−1 frames of the images are to-be-processed images;
      obtaining N−1 frames of ghost-free images based on the to-be-processed images;
      performing an averaging operation on the reference image and the N−1 frames of ghost-free images to obtain a second target image;
      performing registration on the first new image and the reference image to obtain a first registered image; and
      either:
        obtaining a first difference image based on the first registered image and the second target image, obtaining a first ghost weight image based on the first difference image, performing fusion on the first registered image and the second target image to obtain a first ghost-free image, and performing pixel-value weighted fusion to obtain the first target image; or
        performing luminance correction on the second target image to obtain a third target image, obtaining a second difference image based on the first registered image and the third target image, obtaining a second ghost weight image based on the second difference image, performing fusion on the first registered image and the third target image to obtain a second ghost-free image, performing pixel-value weighted fusion on the second ghost-free image and the third target image to obtain a fourth target image, and performing pyramid fusion on the fourth target image and the second target image to obtain the first target image.

10. The terminal device of claim 9, wherein the terminal device further comprises an antenna coupled to the image processing apparatus and is configured to:
send a radio communication signal to implement radio communication with a mobile communications network that comprises one or more of a Global System for Mobile Communications (GSM) network, a code division multiple access (CDMA) network, a third generation (3G) network, a fourth generation (4G) network, frequency division multiple access (FDMA), time division multiple access (TDMA), Personal Digital Cellular (PDC), Total Access Communication System (TACS), Advanced Mobile Phone System (AMPS), wideband CDMA (WCDMA), time division-synchronous CDMA (TDSCDMA), WI-FI, or a Long Term Evolution (LTE) network; and
receive the communication signal.

11. The terminal device of claim 9, wherein the instructions further cause the terminal device to be configured to generate a control signal when one or more of:
a to-be-photographed image of the camera is a moving image;
the current exposure time exceeds a safe time; or
the current ISO sensitivity is in a first preset threshold interval and the current exposure time is in a second preset threshold interval, and
wherein the control signal instructs to obtain the N frames of the images.

12. The terminal device of claim 9, wherein the instructions further cause the terminal device to be configured to:
perform fusion on the first registered image and the second target image to obtain the first ghost-free image based on the first ghost weight image; and
perform pixel-value weighted fusion to obtain the first target image based on the first ghost-free image and the second target image.

13. The terminal device of claim 9, wherein the instructions cause the terminal device to be configured to:
perform pixel-value weighted fusion on the second ghost-free image and the second target image to obtain the first target image.

14. The terminal device of claim 9, wherein the instructions further cause the terminal device to be configured to enter into a snapshot mode.

15. The terminal device of claim 11, wherein the instructions further cause the terminal device to be configured to determine that the to-be-photographed image of the camera is the moving image by performing motion detection on a preview data stream to analyze a photographing preview stream.

16. The terminal device of claim 9, wherein the instructions further cause the terminal device to be configured to enter a first snapshot mode when a to-be-photographed image is a moving image, a current exposure time of the camera exceeds a safe time, and an environment of the to-be-photographed scene is an extreme high-light environment.

17. The terminal device of claim 16, wherein the instructions further cause the terminal device to be configured to enter a second snapshot mode when the to-be-photographed image is the moving image, and the current exposure time of the camera exceeds the safe time, and the environment of the to-be-photographed scene is a moderate high-light environment.

* * * * *